US012072191B2

(12) United States Patent
Merlinge et al.

(10) Patent No.: US 12,072,191 B2
(45) Date of Patent: Aug. 27, 2024

(54) PARTICLE FILTERING METHOD AND NAVIGATION SYSTEM USING MEASUREMENT CORRELATION

(71) Applicant: OFFICE NATIONAL D'ETUDES ET DE RECHERCHES AÉROSPATIALES, Palaiseau (FR)

(72) Inventors: Nicolas Merlinge, Palaiseau (FR); Clément Audebert, Asnieres (FR); Karim Dahia, Palaiseau (FR); Bruno Herisse, Palaiseau (FR); Jean-Michel Allard, Palaiseau (FR)

(73) Assignee: OFFICE NATIONAL D'ETUDES ET DE RECHERCHES AÉROSPATIALES, Palaiseau (FR)

( * ) Notice: Subject to any disclaimer, the term of this patent is extended or adjusted under 35 U.S.C. 154(b) by 270 days.

(21) Appl. No.: 17/784,509

(22) PCT Filed: Dec. 7, 2020

(86) PCT No.: PCT/EP2020/084817
§ 371 (c)(1),
(2) Date: Jun. 10, 2022

(87) PCT Pub. No.: WO2021/115993
PCT Pub. Date: Jun. 17, 2021

(65) Prior Publication Data
US 2023/0026000 A1    Jan. 26, 2023

(30) Foreign Application Priority Data

Dec. 13, 2019    (FR) ...................................... 1914339

(51) Int. Cl.
*G01C 21/18*    (2006.01)

(52) U.S. Cl.
CPC .................................. *G01C 21/18* (2013.01)

(58) Field of Classification Search
CPC ....................................................... G01C 21/18
See application file for complete search history.

(56) References Cited

U.S. PATENT DOCUMENTS

| 8,463,461 B2 * | 6/2013 | Estkowski | ........... | G08G 5/0013 |
| | | | | 701/3 |
| 10,386,493 B2 * | 8/2019 | Irish | ........................ | G01S 19/22 |

(Continued)

FOREIGN PATENT DOCUMENTS

| FR | 2 832 796 | 5/2003 |
| WO | 2018/002932 | 1/2018 |

OTHER PUBLICATIONS

International Search Report and Written Opinion dated Mar. 5, 2021, for PCT/EP2020/084817, 16 pp., including English translation of the International Search Report.

(Continued)

*Primary Examiner* — Seth A Silverman
(74) *Attorney, Agent, or Firm* — NIXON & VANDERHYE

(57) ABSTRACT

A box regularized particle filtering method implements a binary representation of numbers. This implementation can be used to determine a box division coordinate and/or to modify state intervals according to a fixed probability kernel, for example according to an Epanechnikov kernel. The method can be executed autonomously within a navigation system using measurement correlation, in particular on board an aircraft such as an airplane, a flying drone or any self-propelled airborne vehicle.

20 Claims, 3 Drawing Sheets

(56) References Cited

U.S. PATENT DOCUMENTS

| | | | |
|---|---|---|---|
| 10,656,282 B2 * | 5/2020 | Irish | G01S 19/428 |
| 10,976,466 B2 * | 4/2021 | Villien | G01V 9/00 |
| 2012/0143495 A1 * | 6/2012 | Dantu | G01C 21/206 |
| | | | 455/457 |
| 2014/0372026 A1 * | 12/2014 | Georgy | G01S 19/47 |
| | | | 701/469 |
| 2018/0283882 A1 * | 10/2018 | He | H04L 67/30 |

OTHER PUBLICATIONS

Nicolas Merlinge et al., "A Box Regularized Particle Filter for state estimation with severely ambiguous and non-linear measurements", Automatica, vol. 104, Mar. 12, 2019, pp. 102-110.

Amadou Gning et al., "An Introduction to Box Particle Filtering", Signal Processing Magazine, vol. 30, No. 4, Jul. 2013, pp. 166-171.

R. C. H. Cheng, "Generating Beta Variates with Nonintegral Shape Parameters", Communications of the ACM, vol. 21, No. 4, Apr. 1978, pp. 317-322.

\* cited by examiner

PARTICLE FILTERING METHOD AND NAVIGATION SYSTEM USING MEASUREMENT CORRELATION

CROSS-REFERENCE TO RELATED APPLICATIONS

This application is the U.S. national phase of International Application No. PCT/EP2020/084817 filed Dec. 7, 2020 which designated the U.S. and claims priority to FR 1914339 filed Dec. 13, 2019, the entire contents of each of which are hereby incorporated by reference.

BACKGROUND OF THE INVENTION

Field of the Invention

The present invention relates to a particle filtering method, as well as a calculation unit and a navigation system using measurement correlation which implement such a method. More particularly, the particle filtering method is of the regularised box type.

Description of the Related Art

The navigation function of an aircraft includes the estimation of its instantaneous position, its instantaneous speed and its instantaneous orientation, called attitude, in the navigation reference frame, also called local geographic trihedron. The set of instantaneous values of the coordinates of position, that is to say the latitude, longitude and altitude of the aircraft, of speed, comprising a speed coordinate in the northern direction, a speed coordinate in the eastern direction and descent speed coordinate, and attitude angles of the aircraft, comprising a roll angle, pitch angle and yaw angle, constitute the instantaneous state of the system formed by the aircraft. The aircraft can be an aeroplane, a drone or any self-propelled airborne vehicle, without limitation.

The acceleration and the angular speed of the aircraft are measured repeatedly and at high speed each along three axes, for example at a repetition frequency of approximately 1000 Hz (Hertz), using accelerometers and gyrometres of an inertial system which is on board the aircraft. The navigation system then delivers estimates of the position and speed coordinates, and the attitude angles of the aircraft, by integrating the results of the accelerometric and gyrometric measurements over time. However, each measurement of acceleration and angular speed is affected by an error, which is mainly composed of bias, a scale factor and a random process, and the accumulation of measurement errors results into an error which affects the estimation of the instantaneous state of the aircraft. This error on the instantaneous state which is estimated grows as a function of time, and is commonly called inertial drift. It is then necessary to associate the inertial system with at least one additional sensor, in order to correct or reduce the inertial drift.

Usual methods for correcting or reducing the inertial drift consist in using geolocation signals, such as satellite navigation signals, for example of the GNSS type, for "global navigation satellite system", or in using signals which are produced by beacons located on the ground, for example radionavigation or GBAS for "ground-based augmentation system" type signals or else to receive a location of the aircraft by radio which was carried out using radar. But such methods are sensitive to jamming or decoys, to the availability of coverage of the area where the aircraft is located in location signals or in communication, etc. It is then desirable in certain circumstances to have on board the aircraft a method which is autonomous for correcting and/or reducing inertial drift. For this purpose, it is common to associate the inertial system with a telemetry probe, which measures a distance between the aircraft and the ground. This telemetry probe can be a radio altimeter, a laser telemetry, etc. without limitation. It measures the distance between the aircraft and the ground in a direction which may or may not be fixed in relation to the aircraft. When this distance measurement direction can be variable, its orientation relative to the aircraft is known. The inertial system is then also associated with a calculation unit which correlates the results of successive measurements which are carried out by the telemetry probe with the instantaneous state of the aircraft as estimated by the inertial system. More specifically, a characterisation of the area overflown by the aircraft is stored on board the aircraft, for example in the form of a relief map which associates a relief height value with each pair of values of latitude and of longitude. Such a relief map record may be in the form of a table, with the latitude and the longitude constituting the table entries, and the relief height values constituting the reading responses in the table. Alternatively, the characterisation of the overflown area can be stored in the form of an analytical function which allows to calculate the relief height values according to the values of latitude or longitude, or in any other suitable form. Then, with each new estimate of the instantaneous position of the aircraft which is produced by the navigation system, a value of the distance which should exist between the aircraft and the ground is obtained by interrogating the characterisation of the overflown area as stored on board the aircraft, in accordance with the estimated position of the aircraft. Optionally, the aircraft-ground distance value may result from a calculation which combines the estimated position of the aircraft with the result(s) of one or more interrogation(s) of the characterisation of the overflown area which is stored on board the aircraft, in particular when the measurement direction of the telemetry probe is oblique with respect to the altitude axis. Such a calculation is known to the person skilled in the art, so that it is not useful to repeat it here. The aircraft-ground distance value which is thus estimated is then compared with the measurement result which is delivered by the telemetry probe. Such a measurement correlation navigation method is commonly referred to as terrain correlation navigation. Several variants have been proposed, but some of them show great sensitivity to the existence of non-linearities in the terrain profiles. In other words, they have the disadvantage of a lack of robustness in their efficiency of convergence towards the true state of the aircraft, depending on the possible terrain profiles.

The methods using terrain correlation navigation which are based on a Box Regularised Particle Filter, or BRPF, allow to correct the inertial drift with greater robustness, compatible with the existence of non-linearities and field ambiguities. The article by Merlinge, N., Dahia, K., Piet-Lahanier, H., Brusey, J., & Horri, N. entitled "A Box regularised particle filter for state estimation with severely ambiguous and non-linear measurements", Automatica (2019), Vol. 104, pp. 102-110, describes such a method. Each of these methods still consists in iteratively calculating an instantaneous state of the aircraft from a last state previously determined, and in correlating the distance measurement result which is obtained by the telemetry probe with a distance value which is moreover reconstituted from the characterisation of the terrestrial relief on board the aircraft and the position and attitude values. But, a box regularised particle filter proceeds by manipulating state intervals, of dimension nine when each state of the aircraft consists of three position coordinates, three speed coordinates and three attitude angles as described above. In addition, a weight value with probabilistic significance is associated with each state interval: the weight of each state interval corresponds to the probability that the true state of the aircraft lies in this state interval. However, these methods using terrain correlation navigation that are based on particle filters have not yet been implemented for real aircraft, because of the very large calculation resources that are required. Indeed, it is required for many aeronautical applications that the method using terrain correlation navigation which is used can be implemented by a calculation unit of the Field-Programmable Gate Array circuit type, or FGPA. However, circuits of this type have capacities which are still too limited.

In a known manner, a box regularised particle filtering method comprises at least one execution of a sequence which includes the following steps:

/1/ a prediction step, comprising predicting subsequent state intervals, each subsequent state interval being obtained by applying at least one propagation rule to one of a plurality of previous state intervals, each state interval being possibly multidimensional;

/2/ a step of measuring a true state;

/3/ a step of contracting at least one of the subsequent state intervals, according to at least one measurement result of the true state which was obtained in step /2/;

/4/ a step of updating weights, comprising assigning a weight to each subsequent state interval according to a size of this subsequent state interval as resulting from step /3/, with a size of the same subsequent state interval as resulting from step /1/ before step /3/, and a weight of the previous state interval from which this subsequent state interval resulted in step /1/; and /5/ a step of redistributing the subsequent state intervals, comprising replacing at least one of the subsequent state intervals i by $n_i$ sub-intervals originating from a division of the subsequent state interval i, i being an integer numbering index of the subsequent state intervals, and $n_i$ being a number of the sub-intervals which replace this subsequent state interval i, each sub-interval being intended to constitute a previous state interval for a subsequent iteration of the sequence of steps /1/ to /5/.

These steps comprise various calculations, some of which require significant calculation resources. This is the case in particular for those of the previous steps which require calculating a result of a function of the type $X^\alpha$, where X is a variable whose value changes between different executions of the step, and $\alpha$ is a non-zero exponent whose value is constant for all executions of the same step. For this reason, the box regularised particle filtering method is not compatible with an implementation on board an autonomous vehicle. In particular, it cannot be implemented by a calculation unit of the FGPA type.

Document WO 2018/002932 describes a method for determining the position of a vehicle relative to a traffic lane, which is based on captured images of light sources, and which uses a particle filtering algorithm.

Document FR 2 832 796 describes a system using terrain correlation navigation for aircraft.

SUMMARY OF THE INVENTION

From this situation, an object of the present invention is to optimise the use of a box regularised particle filter, in particular so that this filter can be implemented on board an aircraft. Beyond that, the object of the invention is to contribute to the fact that a box regularised particle filtering method can be implemented by an FPGA-type circuit.

To achieve at least one of these objects or another, a first aspect of the invention proposes a box particle filtering method for predicting a state of a system, which comprises the steps /1/ to /5/ mentioned above, and wherein at least one of these steps /1/ to /5/ comprises at least one calculation of an estimate of the value of $X^\alpha$, where X is a variable number for each execution of the step and $\alpha$ is a non-zero exponent value that is constant between different executions of the step, the number X being positive if the exponent $\alpha$ is not an integer and non-zero if the exponent $\alpha$ is negative. The concerned system can be a land, air, sea or space vehicle which is equipped with a navigation system using measurement correlation. The calculation of the estimate of the value of $X^\alpha$ comprises the following steps:

/a/ writing the number X in the form $X=\pm(1+m)\cdot 2^{ex}$, where ex is a negative, positive or zero integer, and m is a mantissa comprised between 0 and 1, the value 0 being allowed, so that a binary representation of the number X is:

$I(X)=L\cdot(m+ex+B)$, where $L=2^n$ with n which is a number of bits of a binary writing of the mantissa m, and B is a positive or zero constant number, called bias;

/b/ calculating a binary representation of $X^\alpha$ in the form: $I(X^\alpha)=\alpha\cdot I(X)+L\cdot(1-\alpha)\cdot(B-\sigma)$, where $\sigma$ is a constant number whose value is recorded; and /c/ obtaining the estimate of the value of $X^\alpha$ from the binary representation $I(X^\alpha)$.

Such a calculation, which replaces the estimation of the function of $X^\alpha$ by a calculation based on the binary representation of the number X, is particularly economical in calculation resources, and short in calculation time. Furthermore, it can be performed by an FPGA-type circuit.

In particular embodiments of the invention, the step of the box regularised particle filtering method which comprises the calculation of the estimate of the value of $X^\alpha$ may be the step /5/, in particular a sub-step of this step /5/ which consists in calculating a measure value of a part of a subsequent state interval of the system. This subsequent state interval part of the system may be a system position interval, a system speed interval, or a system attitude interval. Alternatively or in addition, the calculation of the estimate of the value of $X^\alpha$ can be part of another sub-step of step /5/, which consists in applying a probability kernel smoothing to the sub-intervals to obtain the previous state intervals of the subsequent iteration of the sequence of steps /1/ to /5/. The calculation that is the object of the invention can therefore be used on the one hand for the measure value of a part of the subsequent state interval of the system, and on the other hand to apply the probability kernel smoothing.

Generally for the invention, and in particular to obtain a more exact estimate of the value of $X^\alpha$, the calculation of the estimate of the value of $X^\alpha$ can further comprise executing at least once the following additional step:

/d/ calculating a new estimate of the value of $X^\alpha$ from a previous estimate of the value of $X^\alpha$, by applying a recursive algorithm for approximate equation solving to the equation $Y^{1/\alpha}-X=0$ of unknown Y, the estimate of the value of $X^\alpha$ which was obtained in step /c/ being used as a previous estimate for a first application of the algorithm, and the new estimate of the value of $X^\alpha$ which is produced by a $q^{th}$ application of the algorithm forming the previous estimate of the value of $X^\alpha$ for the $(q+1)^{th}$ application of the algorithm, if such a $(q+1)^{th}$ application of the algorithm is performed, q being an integer number greater than or equal to 1.

For such a refinement of the invention, the recursive algorithm for approximate equation resolution which is used in step /d/ may be Newton's method, or another equivalent algorithm or which performs the same function.

In preferred embodiments of the invention, at least one of the following additional features can be reproduced optionally, alone or in combination of several of them:
- the number n of the bits of the binary writing of the mantissa m may be equal to 23, and the bias B can be equal to 127. Alternatively, the number n may be equal to 52 bits and the bias B equal to 1023;
- the constant number σ may be comprised between 0 and 1, preferably comprised between 0 and 0.5; and
- the exponent value α may be equal to +2, −2, +½ or −½, in particular.

A second aspect of the invention proposes a calculation unit, this calculation unit comprising at least one first input which is adapted to receive results of repeated measurements of acceleration and angular speed of a system, and a second input which is adapted to receive results of repeated measurements of a true state of the system, additional to the acceleration and angular speed measurements. The calculation unit is then arranged to execute a box regularised particle filtering method which is in accordance with the first aspect of the invention. In this way, the calculation unit outputs a series of state intervals with respective weights, the weight that is associated with each of the state intervals corresponding to a probability value that the true state of the system is within this state interval.

Such a calculation unit can be of one of the following types:
- field-programmable gate array circuit, or FPGA,
- fixed gate array circuit, known by the acronym DSP for "Digital Signal Processor", and
- central unit processor, known by the acronyms CPU for "Computer Processing Unit" or RISC for "Reduced Instruction set Computer".

A third aspect of the invention relates to a navigation system using measurement correlation, which is adapted to be on board a vehicle and which comprises:
- an inertial system, which is adapted to iteratively measure accelerations and angular speeds of the vehicle, and to deduce, using the results of measurements of the accelerations and angular speeds, subsequent state intervals respectively from several previous state intervals, each state of the vehicle comprising position, speed and attitude coordinates of this vehicle;
- a measurement system, which is adapted to iteratively measure at least one feature of a true state of the vehicle; and
- a calculation unit which is in accordance with the second aspect of the invention, and which is adapted to reduce at least one position, speed and/or attitude drift of the inertial system, by using the measurement results of the feature of the true state of the vehicle which are delivered by the measurement system.

Finally, a fourth aspect of the invention proposes a vehicle which comprises a navigation system using measurement correlation in accordance with the third aspect of the invention. Such a vehicle may be an aircraft, in particular an aeroplane, a flying drone or any self-propelled airborne vehicle, or a vehicle capable of moving on the ground, in particular a mobile drone on the ground, or a ship, a submarine, a space machine, in particular a space probe, satellite, etc. without limitation. Depending on the case, the measurement system may be a telemetry probe which is intended to measure a distance between the vehicle and a point on the ground, a system for tracking landmarks or stars, a sonar for measuring a height of water under the ship or submarine, etc.

BRIEF DESCRIPTION OF THE DRAWINGS

The features and advantages of the present invention will appear more clearly in the detailed description below of non-limiting examples of implementation, with reference to the appended figures, among which.

DESCRIPTION OF THE PREFERRED EMBODIMENTS

Figure 1:
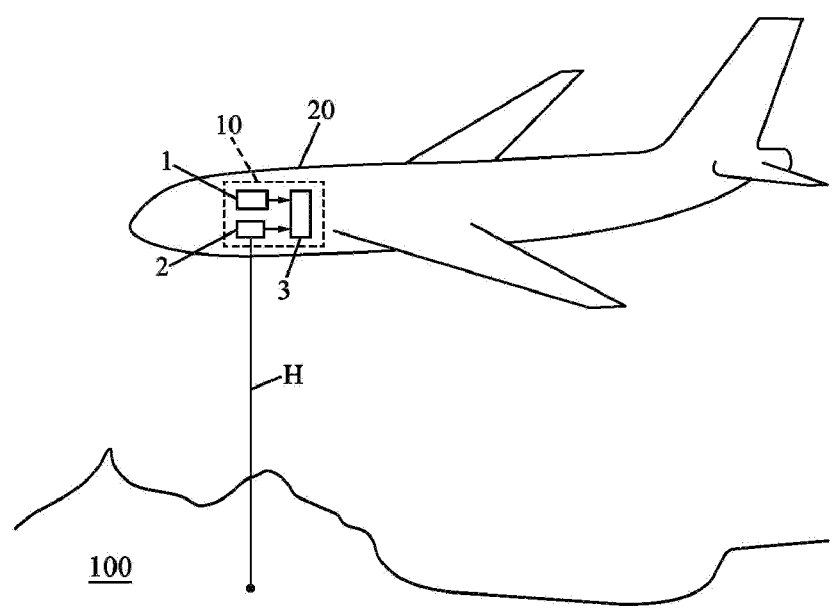
FIG. 1 shows an aircraft which is equipped with an inertial system using terrain correlation in accordance with the invention.

For reasons of clarity, the dimensions of the elements which are represented symbolically in [FIG. 1] correspond neither to actual dimensions nor to actual dimensional ratios. Furthermore, the invention is described by way of non-limiting example for a case of application to an aircraft, but it is understood that it can be applied to any vehicle which is provided with a navigation system using measurement correlation, whether this vehicle is a land, air, sea, space vehicle, etc.

The mode of calculating an estimate of the value of $X^\alpha$ which is used in the invention is described first. α denotes an exponent which is non-zero, whose value is constant. X is a number of variable value, which is positive when the value of the exponent α is not an integer, and non-zero when the value of the exponent α is negative.

In a known manner, the number X can be written uniquely in the following form, in accordance with the IEEE standard 754:

$$X = \pm(1+m)\cdot 2^{ex},$$

where ex is a positive or zero integer, and m is a mantissa comprised between 0 and 1, the value 0 being also allowed. The number ex and the mantissa m thus depend on the value of the number X.

Then, when X is positive, we have:

$$\log_2 X = ex + m + \sigma,$$

where σ is a fixed real number allowing to minimise an error on the value of $\log_2 X$, in particular when a belonging numerical interval is known a priori for the number X. For example, the value of the number σ can be taken equal to 0.043036. And therefore:

$$ex + m = \log_2 X - \sigma.$$

Moreover, the number X can be represented in binary form by I(X) defined by:

$$I(X) = L\cdot(m + ex + B),$$

where $L = 2^n$, with n being a fixed number of bits to write the mantissa m in binary form, and B being a positive or zero constant number, which is called bias. The role of the bias B is to allow the use of a representation of the type I(X) also for negative values of the number X. In the representation I(X) of the number X, L, m, ex and B are expressed in binary form. For example, n may be equal to 23, and B may be equal to 127. To have a calculation precision that is higher, n may alternatively be equal to 52, and in this case B may be equal to 1023. By transferring in the binary representation $I(X)$ the expression of $ex+m$ as derived from $\log_2 X$, it becomes:

$$I(X)=L\cdot[\log_2 X-\sigma+B], \text{ that is to say: } \log_2 X=I(X)/L+\sigma-B.$$

However, in the same way as $I(X)$ in the previous line, the binary representation of $X^\alpha$ is:

$$I(X^\alpha)=L\cdot[\log_2(X^\alpha)-\sigma+B]$$

But $\log_2(X^\alpha)=\alpha\cdot\log_2(X)$, therefore: $I(X^\alpha)=L\cdot[\alpha\cdot\log_2(X)-\sigma+B]$, and replacing $\log_2(X)$ by its expression according to the binary representation $I(X)$, it becomes:

$$I(X^\alpha)=L\cdot[\alpha\cdot(I(X)/L+\sigma-B)-\sigma+B], \text{ that is to say:}$$
$$I(X^\alpha)=\alpha\cdot I(X)+L\cdot(1-\alpha)\cdot(B-\sigma).$$

An approximate value of $X^\alpha$, denoted $Y_0$, can then be reconstructed from the binary representation of $X^\alpha$ which was thus obtained, using a reverse method to that which provides the binary representation of a number from this number. The difference between this approximate value Y0 and the true value of $X^\alpha$ depends on the value that has been adopted for the number $\sigma$. When X can be negative and the value of the exponent $\alpha$ is integer, the sign of $X^\alpha$ can be determined according to that of X, retained since the start of the calculation method, and the parity of the exponent $\alpha$. For many applications, the approximate value $Y_0$ is satisfactorily suitable for replacing $X^\alpha$, given the simplicity of the method for obtaining this approximate value $Y_0$, as just described.

For the particular case where the exponent $\alpha$ is equal to 2:

$$I(X^2)=2\cdot I(X)-L\cdot(B-\sigma).$$

For the particular case where the exponent $\alpha$ is equal to $-2$:

$$I(X^{-2})=-2\cdot I(X)+3\cdot L\cdot(B-\sigma).$$

For the particular case where the exponent $\alpha$ is equal to $\frac{1}{2}$:

$$I(X^{1/2})=I(X)/2+0.5\cdot L\cdot(B-\sigma).$$

For the particular case where the exponent $\alpha$ is equal to $-\frac{1}{2}$:

$$I(X^{-1/2})=-I(X)/2+1.5\cdot L\cdot(B-\sigma).$$

For applications where the approximate value $Y_0$ does not constitute a sufficiently precise evaluation of $X^\alpha$, it is possible to improve this evaluation by using one of the methods for refining approximate values which are known to the person skilled in the art. Newton's algorithm, also called Newton's method, may be used in particular, by applying it to the function $f(Y)=Y^{1/\alpha}-X$ and to the equation $f(Y)=0$. Successive approximate values $Y_q$, q being an integer index for numbering these values, can thus be obtained according to the formula: $Y_{q+1}=Y_q-f(Y_q)/f'(Y_q)$, where $f'(Y_q)$ is the value of the function derived from f, estimated for the value $Y_q$. That is to say, by calculating the expression of $f'(Y)$ from that of $f(Y)$:

$$Y_{q+1}=(1-\alpha)\cdot Y_q+\alpha\cdot X\cdot Y_q^{(\alpha-1)\alpha}, \text{ for } q=0,1,2,\ldots.$$

For the particular case where the exponent $\alpha$ is equal to 2, it becomes:

$$Y_{q+1}=-Y_q+2\cdot X\cdot Y_q^{1/2}.$$

In particular, the first-order approximate value of $X^2$ is:

$$Y_1=-Y_0+2\cdot X\cdot Y_0^{1/2}.$$

The value of $Y_q^{1/2}$ can be estimated each time by using the formula $I(X^\alpha)=\alpha\cdot I(X)+L\cdot(1-\alpha)\cdot(B-\sigma)$, and by replacing in this formula X by $Y_q$ and a by $\frac{1}{2}$.

For the particular case where the exponent $\alpha$ is equal to $-2$, it becomes:

$$Y_{q+1}=3\cdot Y_q-2\cdot X\cdot Y_q^{3/2}.$$

In particular, the first-order approximate value of $X^{-2}$ is:

$$Y_1=3\cdot Y_0-2\cdot X\cdot Y_0^{3/2}.$$

The value of $Y_q^{3/2}$ can be estimated each time by again using the formula $I(X^\alpha)=\alpha\cdot I(X)+L\cdot(1-\alpha)\cdot(B-\sigma)$, and replacing in this formula X by $Y_q$ and a by $3/2$.

For the particular case where the exponent $\alpha$ is equal to $\frac{1}{2}$, it becomes:

$$Y_{q+1}=0.5 Y_q+0.5 X/Y_q.$$

In particular, the first-order approximate value of $X^{1/2}$ is:

$$Y_1=0.5\cdot Y_0+0.5\cdot X/Y_0.$$

For the particular case where the exponent $\alpha$ is equal to $-\frac{1}{2}$, it becomes:

$$Y_{q+i}=(3/2)Y_q-0.5\cdot X\cdot Y_q^3.$$

In particular, the first-order approximate value of $X^{-1/2}$ is:

$$Y_1=(3/2)\cdot Y_0-0.5\cdot X\cdot Y_0^3.$$

The approximate value $Y_0$, as obtained by using the binary representations of numbers, and the values $Y_{q,\ q\geq 1}$, as obtained by using one of the methods for refining approximate values such as the Newton's method, do not require significant calculation resources. They can therefore be calculated easily by a calculation unit of the FPGA, DSP, CPU or RISC type.

In accordance with [FIG. 1], an aircraft 20 is equipped with a navigation system using terrain correlation, designated by the reference 10. The navigation system 10 comprises an inertial system 1, a telemetry probe 2 and a calculation unit 3. In a known manner, the inertial system 1 repeatedly performs measurements of three acceleration coordinates and three angular speed coordinates of the aircraft 20, using accelerometers and gyrometres, not shown. Moreover, the telemetry probe 2 repeatedly performs measurements of the distance H which exists between the ground 100 and the aircraft 20. This distance H is measured in a direction which may be fixed with respect to the aircraft 20, for example perpendicularly to a reference plane of the aircraft. Optionally, the telemetric measurement direction can be variable with respect to the aircraft 20, but in such a case this measurement direction is controlled and taken into account in an adequate manner, which is also known. The distance H therefore varies according to the terrestrial relief which is overflown by the aircraft 20, as well as according to its altitude and its attitude. In the following, the present description is limited to the only case where the measurements additional to those of the inertial system 1 consist of the measurements of the distance H. This case corresponds to a terrain correlation navigation. However, it is understood that other additional measurements can be used alternatively to those of the distance H, or in addition to them. Finally, the invention is compatible with inertial system and telemetry probe models as commercially available. In particular, the inertial system can be of a MEMS, for "Micro-Electro- Mechanical System", quadrason, gyrolaser type, etc., and the telemetry probe can be a radio altimeter, a laser telemeter, etc.

Each possible state for the aircraft 20 can be composed of three spatial coordinate values which identify a position for the aircraft, for example in the terrestrial reference frame, three speed values each according to one of the spatial coordinates, and three angular values to identify an orientation of the aircraft, for example three Euler angle values, for a total of nine state coordinates. Under these conditions, a state interval for the aircraft 20 is formed by a combination of nine one-dimensional intervals which each relate separately to one of the state coordinates. Such a state interval is called a box in the language of the person skilled in the art.

The box regularised particle filtering method is initialised by supplying several initial state intervals, each associated with a weight which indicates a probability value for the true state of the aircraft 20 to initially be in this initial state interval. Thus, N initial state intervals are provided, N being an integer number, for example equal to 16 or 32, preferably less than or equal to 128. Each initial state interval is individually associated with a weight value, which can be equal to 1/N.

The method then consists of successive iterations of a sequence of steps, each new execution of the sequence of steps producing an update of the state intervals, with updated weight values which are associated one-by-one with the updated state intervals. Furthermore, each new execution of the sequence of steps is performed from the state intervals and their associated weight values as provided by the immediately preceding execution of the sequence of steps.

Figure 2:
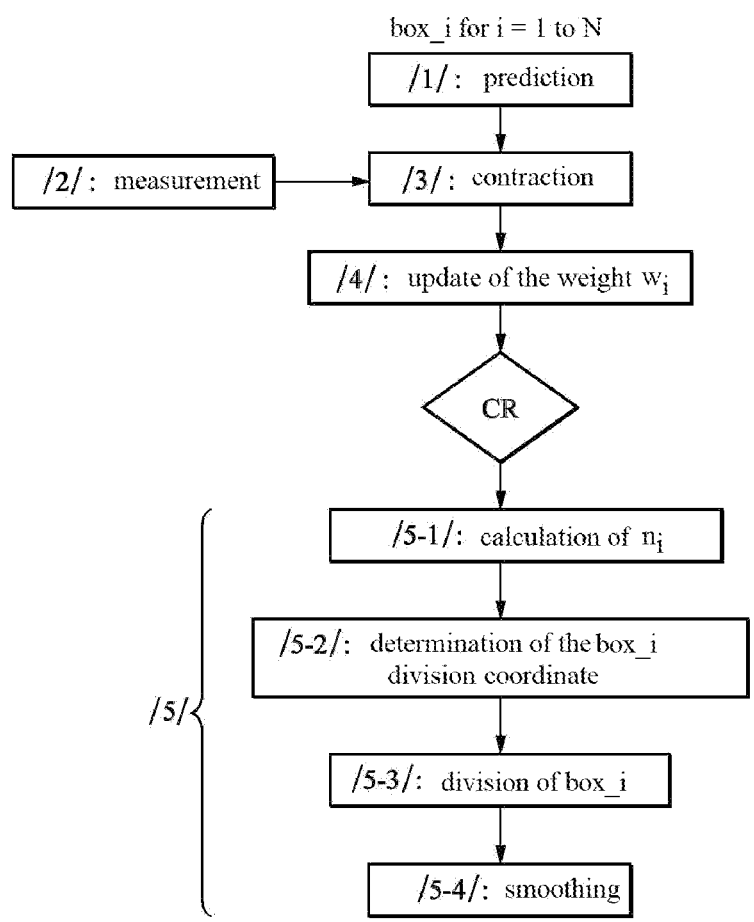
FIG. 2 is a diagram which shows the sequence of steps of a method in accordance with the invention.

Each sequence of steps comprises a prediction step, denoted /1/ in [FIG. 2], a measurement step denoted /2/, a contraction step denoted /3/, a step /4/ of updating the weight of each state interval, and a step /5/ of redistributing the state intervals. Steps /1/ and /3/ to /5/ are executed for each state interval. Since step /5/ produces a redistribution of the state intervals as resulting from step /3/, it is preferably executed so as to keep a constant number of state intervals. Then the calculation unit 3 may be designed and dimensioned to process N state intervals at each execution of the sequence of steps /1/ to /5/. i is an integer index, from 1 to N, which numbers the state intervals that are processed at each iteration of this sequence of steps /1/ to /5/.

For each state interval i, denoted box_i, the prediction step /1/ consists in collecting the results of the last acceleration and angular speed measurements, as delivered by the inertial system 1. Optionally, the results of several measurements which have been carried out by the inertial system 1 since the previous execution of the sequence of steps /1/ to /5/can be collected. For each of the state intervals box_i, this step /1/ also comprises calculating a change of this state interval during the period of time which has elapsed between the two executions of step /1/, relating to the previous iteration and the current new iteration of the sequence of steps /1/ to /5/. The calculation principle of such change in each state interval box_i, from the results of the acceleration and angular speed measurements, is assumed to be known to the person skilled in the art. Reference may be made on this subject to the article by Merlinge, N., Dahia, K., Piet-Lahanier, H., Brusey, J., & Horri, N. which is entitled "A Box regularized particle filter for state estimation with severely ambiguous and non-linear measurements", Automatica (2019), Vol. 104, pp. 102-110. This step /1/ results in a translation, most often accompanied by a change in length, of each one-dimensional interval which relates to one of the state coordinates of the aircraft 20. In the general part of this description, each state interval box_i as it exists at the time of starting the execution of step /1/ has been called a previous state interval, and this state interval box_i as modified by step /1/ has been called the subsequent state interval.

The measurement step /2/ consists in collecting the result of the last measurement of distance H as delivered by the telemetry probe 2. Possibly, the results of several last measurements which have been carried out by the telemetry probe 2 since the previous execution of step /2/, during the previous iteration of the sequence of steps /1/ to /5/, can be collected.

The contraction step /3/ consists in reducing the size of each state interval box_i according to incompatibilities which would exist between parts of this state interval and the last distance H measurement result(s) collected in step /2/. Typically, the six position and attitude coordinates of the aircraft 20, as may vary within each state interval box_i resulting from step /1/, are combined with relief height values read in a terrain map which is stored, in order to obtain an estimate of the distance H associated with each state. Such a calculation can be performed in the known manner which was recalled at the beginning of this description. The distance H thus estimated is compared with the result of the measurement of step /2/. Generally, an implicit equation can be implemented to convert each state of the aircraft 20 into a distance H value, using the stored terrain map. But such an equation, called an observation equation by the person skilled in the art, can be difficult to invert locally, so that modelling its inverse function by an analytical function part and a tabulated function part can be advantageous. The person skilled in the art can also refer to the article by Merlinge and al., Automatica 104 (2019), mentioned above, about step /3/ which is not directly concerned with improving the method provided by the invention.

The update step /4/ consists in updating the value of the weight of each state interval as resulting from step /3/. For example, a new value of the weight of the state interval box_i may be equal to the value of the weight of this state interval box_i as it existed before performing this update, multiplied by the size of the state interval box_i as resulting from the contraction step /3/, and divided by the size of the state interval box_i as resulting from the prediction step /1/ before applying the contraction step /3/. Other formulae for updating weight values may be adopted alternatively. Optionally, the weight values as resulting from one of these formulas can also be corrected, for example by multiplying them by a non-zero common factor, to ensure that their sum is equal to the unit.

The purpose of step /5/ is to redistribute the state intervals as resulting from step /3/, to obtain a better statistical representativeness of the states which are possible for the aircraft 20. The execution of this step /5/ may be subjected to the result of an optional test designated by CR in [FIG. 2]. This test consists in determining if a representativeness criterion is satisfied by the state intervals with their respective weight values. It relates to all the values of the weights $w_i$ as updated in step /4/, where $w_i$ is the weight that is associated with the state interval box_i. A first representativeness criterion that can be used is the one known as the N-effective criterion. This criterion is satisfied if $(\Sigma_{i=1 \ldots N} w_i^2)^{-1} < \theta_{eff} \cdot N$, where $\theta_{eff}$ is an adjustment parameter of the N-effective criterion, comprised between 0 and 1. Also another possible representativeness criterion is the one known as the entropic criterion: it is satisfied if $\log(N) + \Sigma_{i=1 \ldots N} w_i \cdot \log(w_i) > \theta_{ent} \cdot N$, where $\theta_{ent}$ is an adjustment parameter of the entropic criterion, comprised between 0 and 1. But other representativeness criteria which are also known to the person skilled in the art can still be used alternatively. Step /5/ of redistributing state intervals is then applied if the representativeness criterion is not satisfied.

Step /5/ comprises first determining a division number $n_i$ which is assigned to the state interval box_i, with the index i which again numbers the state intervals from 1 to N. This sub-step is denoted /5-1/ in [FIG. 2]. In a known manner, it can be executed using a multinomial drawing method. Such a method consists in drawing points randomly and repeatedly inside a one-dimensional segment, to determine the number $n_i$ of the sub-intervals which are intended to replace the state interval box_i, according to the values of the weights $w_i$ of all state intervals as updated in step /4/. The drawing segment is made up of a juxtaposition of elementary segments, the individual lengths of which correspond one-by-one to the values of the weights of the state intervals. The number $n_i$ of sub-intervals which will replace the state interval box_i is then proportional to the number of randomly drawn points which belong to the elementary segment whose length is equal to the weight value of the state interval box_i. If the value of $n_i$ which is thus determined for one of the state intervals is zero, this state interval is deleted, otherwise the state interval box_i is divided into $n_i$ sub-intervals, the value obtained for $n_i$ being statistically greater as the weight of the state interval box_i as resulting from step /4/ is high. Optionally, the values of $n_i$ which are thus obtained can be multiplied by a constant factor and rounded, in order to limit the total number of sub-intervals implemented, and/or to ensure that the sum of all the values of $n_i$ is equal to N. However, this way of executing sub-step /5-1/ is only given by way of example, and different methods can be used alternatively in variant implementations of the invention.

Each state interval box_i is then intended to be divided into $n_i$ sub-intervals, in sub-step /5-3/, for example in one of the ways that are described in the following articles:

"An introduction to box particle filtering [reading notes]" by Gning, A., Ristic, B., Mihaylova, L., & Abdallah, F., IEEE Signal Processing Magazine (2013), Vol. 30(4), pp. 166-171; and "A Box regularised particle filter for state estimation with severely ambiguous and non-linear measurements" by Merlinge, N., Dahia, K., Piet-Lahanier, H., Brusey, J., & Horri, N., Automatica (2019), Vol. 104, pp. 102-110, already mentioned above.

These division methods consist in first determining that of the system state coordinates, according to which the state interval box_i is the largest. This determination is the subject of sub-step /5-2/ which is now described.

Each of the state intervals box_i relates to several state coordinates of at least two different types. For example, in the case of the navigation system 10 which was described above for the aircraft 20, the three position coordinates, denoted $x_1$, $x_2$ and $x_3$, are state coordinates of a first type, the three speeds, denoted $v_1$, $v_2$ and $v_3$, are state coordinates of a second type, and the three attitude angles, denoted $\theta_1$, $\theta_2$ and $\theta_3$, of the aircraft 20 are state coordinates of a third type. Then, normalised and dimensionless values of the lengths of the one-dimensional intervals of the state interval box_i, according to each of the state coordinates, are:

$$\Delta x_{j\_n} = \Delta x_j \cdot (\Delta x_1^2 + \Delta x_2^2 + \Delta x_3^2)^{-1/2},$$

$$\Delta v_{j\_n} = \Delta v_j \cdot (\Delta v_1^2 + \Delta v_2^2 + \Delta v_3^2)^{-1/2}, \text{ and}$$

$$\Delta \theta_{j\_n} = \Delta \theta_j \cdot (\Delta \theta_1^2 + \Delta \theta_2^2 + \Delta \theta_3^2)^{-1/2},$$

for j=1, 2 and 3 in each case, where $\Delta x_j$, $\Delta v_j$ and $\Delta \theta_j$ are the lengths of the respective one-dimensional intervals of the nine state coordinates for the state interval box_i. Each of the values $\Delta x_j^2$, $\Delta v_j^2$ and $\Delta \theta_j^2$ can be calculated using the method that was presented above for $X^\alpha$, with $\alpha$ equal to 2. Then each of the factors $(\Delta x_1^2 + \Delta x_2^2 + \Delta x_3^2)^{-1/2}$, $(\Delta v_1^2 + \Delta v_2^2 + \Delta v_3^2)^{-1/2}$ and $(\Delta \theta_1^2 + \Delta \theta_2^2 + \Delta \theta_3^2)^{-1/2}$ can also be calculated using the same method, but with a which is then equal to $-1/2$. These factors have been referred to as measure values of state interval parts in the general part of this description. The normalised values $\Delta x_{j\_n}$, $\Delta v_{j\_n}$ and $\Delta \theta_{j\_n}$ of the lengths of the nine one-dimensional intervals of the state interval box_i are then obtained according to the previous formulas, by calculating products.

These normalised values $\Delta x_{j\_n}$, $\Delta v_{j\_n}$ and $\Delta \theta_{j\_n}$ can be compared with each other, and the state coordinate according to which the state interval box_i is the largest is that which corresponds to the largest of the normalised values $\Delta x_{j\_n}$, $\Delta v_{j\_n}$ and $\Delta \theta_{j\_n}$, considering their absolute values. For example, the state interval box_i is the largest according to the position coordinate $x_1$ if $\Delta x_{1\_n}$ is the largest of the normalised values $\Delta x_{j\_n}$, $\Delta v_{j\_n}$ and $\Delta \theta_{j\_n}$, or it is the largest according to the coordinate speed $v_2$ if $\Delta v_{2\_n}$ is the greatest of the nine normalised values, etc.

In sub-step /5-3/, the state interval box_i is divided into n contiguous sub-intervals, by dividing into $n_i$ segments of the same lengths that of the one-dimensional intervals of box_i which is the largest, within the meaning of the normalised values $\Delta x_{j\_n}$, $\Delta v_{j\_n}$ and $\Delta \theta_{j\_n}$. Each sub-interval therefore has one of these segments as one-dimensional interval according to the state coordinate which corresponds to the maximum extension of the state interval box_i, and the same one-dimensional intervals as this state interval box_i according to other state coordinates. The $n_i$ sub-intervals which are thus constructed therefore constitute a partition of the state interval box_i. They form new state intervals from which the box regularised particle filtering method is continued. A weight value is assigned to each of them, which is equal to that of the state interval box_i divided by the division number $n_i$. These new state intervals are then re-numbered by the index i, advantageously from 1 to N, for the continuation of the filtering method.

Finally, the optional sub-step /5-4/ consists in correcting the new state intervals as resulting from the sub-step /5-3/, so that they produce, with their values of associated weights, an even better statistical representation of the state of the system, that is to say of the state of the aircraft 20 for the considered example. Such a modification of the state intervals is commonly called smoothing or regularising the statistical representation of the state of the system, in the language of the person skilled in the art. Corrections which are applied for this to the state intervals can consist of random displacements of the limits of the one-dimensional intervals which constitute the edges of each state interval box_i. Preferably, the respective weight values which are associated with the state intervals are not modified in this sub-step /5-4/. Kernel smoothing methods, also called kernel regularisation, can be applied, in particular as described in the article by Merlinge and al., Automatica 104 (2019), already mentioned. According to these methods, the random displacement which is applied to each limit of one-dimensional interval is generated according to a determined statistical distribution, which is called kernel. In particular, smoothing methods by uniform kernel, or smoothing methods by Gaussian kernel, can be applied. However, an Epanechnikov kernel smoothing method, as described now, may be preferred.

In a known manner, the Epanechnikov kernel is defined by the probability density function $f(x)=3\cdot(1-x^2)/4$, where x is the random variable comprised between −1 and 1, the values −1 and 1 being allowed. Its expectation is zero, and its variance is equal to ⅕.

The sub-step /5-4/ therefore firstly comprises generating random corrections to be applied to each one-dimensional state coordinate interval which determines each of the state intervals box_i, then applying these corrections.

The number of state coordinates of the considered system is noted d, and the number of limits which determine each state interval of this system, that is to say each box used in the regularised particle filtering method is noted $d'=2\cdot d$. In the case of the aircraft 20, $d=9$ and $d'=18$.

First, N first random values are generated, denoted $\beta_i$ and comprised between 0 and 1, the values 0 and 1 being permitted, i being the integer numbering index of the state intervals as used previously, each according to a beta law of statistical distribution, with a first parameter equal to d and a second parameter equal to 2. In a known manner, the beta law whose parameters are d and 2 is defined by the probability density function $x^{d/2-1}\cdot(1-x)\cdot\Gamma(d/2+2)/[\Gamma(d/2)\cdot\Gamma(2)]$, where x denotes the random variable, and $\Gamma$ denotes the gamma function. A possible way to generate the values $\beta_i$ in accordance with the beta law uses Cheng's algorithm which will be recalled later, with reference to [FIG. 3].

N·d' second random values are then generated, denoted $v_{k,i}$, i still being the same index as previously and k being another integer index which varies from 1 to d', each according to a normal law of statistic distribution with zero mean value and standard deviation equal to the unit, commonly called reduced normal law. The index k counts the degrees of freedom in the definition of each state interval. It identifies two one-dimensional interval limits for each state coordinate or, equivalently, a centre value and interval length for each one-dimensional state coordinate interval. In a known manner, the normal law with zero mean value and standard deviation equal to the unit is defined by the probability density function $(1/\pi^{1/2})\cdot\exp[-x^2/2]$, where x again designates the random variable, but in this case positive, zero or negative. It can be simulated by a sum of initial random values which are each generated according to a uniform law of statistical distribution, and such a uniform law of statistical distribution can be produced by a method of the LFSR for "linear feedback shift register" type, for example.

The first N numbers, denote $\xi_i$, are then calculated from the random values $v_{k,i}$ as follows: $\xi_i=[\Sigma_{k=1\ to\ d'}\ (v_{k,i})^2]^{1/2}$. Advantageously, each of these numbers $\xi_i$ can be calculated by applying the method for calculating an estimate of $X^\alpha$ which was described above, at $X=v_{k,i}$ with $\alpha=2$, then at $X=\Sigma_{k=1\ to\ d'}(v_{k,i})^2$ with $\alpha=½$.

N second numbers, denoted $\alpha_i$, are then calculated according to the formula: $\alpha_i=\beta_i^{1/2}/\xi_i$. Advantageously, each of these numbers $\alpha_i$ can be calculated by again applying the method for calculating an estimate of $X^\alpha$ which was described above, at $X=\beta_i$ with $\alpha=½$.

Under these conditions, N·d' third numbers which are calculated in the following way: $\varepsilon_{k,i}=v_{k,i}\cdot\alpha_i$, each satisfy the Epanechnikov statistical distribution law with zero expectation and variance equal to ⅕.

Moreover, a noise amplitude, denoted h, is calculated as follows:

$$h=\mu\cdot A\cdot N^{-1/(d'+4)},$$

where $A=[8\cdot c_{d'}^{-1}\cdot(d'+4)\cdot(2\cdot\pi^{1/2})^{d'}]^{1/(d'+4)}$. In this expression of A, $c_{d'}$ designates the volume of the hyper-sphere of dimension d' and unit radius, and $\mu$ is an adjustment parameter which is comprised between 0 and 1. In a known manner, $c_{d'}=\pi^{d'/2}/\Gamma(d'/2+1)$, where $\Gamma$ still designates the gamma function. The value of $c_{d'}$ can either be pre-calculated and stored so as to be available for the calculation unit 3, or be calculated by the latter, for example by using a pre-recorded table of values of the gamma function. The adjustment parameter $\mu$ controls a compromise between the efficiency of the random smoothing and that of the particle filter. Indeed, the efficiency of the particle filter results from a continuity of possible trajectories for the system, described by those of the state intervals which are maintained during several successive executions of the sequence of steps /1/ to /5/. Conversely, random smoothing produces an interference of these trajectories. The value of the parameter $\mu$ can be fixed initially for the method to be executed by the calculation unit 3. It depends in particular on the numbers N and d, as well as on the type of kernel used for the sub-step /5-4/. For example, the adjustment parameter p can be taken equal to 0.1. The use of the adjustment parameter $\mu$ is in particular described in the thesis of Merlinge, N., entitled "State estimation and trajectory planning using box particle kernels", Paris-Saclay University, 2018.

The random modifications to be applied to the state interval box_i are then $h\cdot\varepsilon_{k,i}$, where k locates the state coordinate limits, or else the central values or lengths of state coordinate intervals. These modifications can be disposed in the form of a vector $E_i$, such that $E_i=[h\cdot\varepsilon_{k,i}]_{k=1,\ldots,d'}$.

A possible method for applying the random modifications to the state intervals as resulting from sub-step /5-3/ will now be described.

For this purpose, each state interval box_i can be represented by a vector $\Xi_i$ of height d', the coordinates of which group together the limits of all the one-dimensional intervals of state coordinates for this state interval, or else the central values and the lengths of its one-dimensional intervals. Then, the randomly modified values of the vector $\Xi_i$ can be obtained by replacing this vector $\Xi_i$ by $\Xi_i+D\times E_i$, where D is a square matrix of dimension d' such that the product of D by the transpose of D is equal to $\Sigma_{i=1\ to\ N}\ \Xi_i\cdot w_i\cdot^t\Xi_i$: $D\times^tD=\Sigma_{i=1\ to\ N}\Xi_i\cdot w_i\cdot^t\Xi_i$, where $w_i$ is the weight value of the state interval box_i. For example, the matrix D can be determined by the Cholesky method, which is well known to the person skilled in the art so that it is not necessary to describe it again here. Under these conditions, the vector $\Xi_i$ is to be replaced by the vector $\Xi_i+D\times E_i$, to apply the random variations according to the selected kernel, of Epanechnikov in the present case, to the one-dimensional intervals of state coordinates of the state interval box_i. The set of vectors $\Xi_i+D\times E_i$ determine all the new state intervals that result from the modification by smoothing.

The method which has just been described for applying, in sub-step /5-4/, a smoothing by Epanechnikov kernel to the sub-intervals as they result from sub-step /5-3/, is implemented by the calculation unit 3 of the navigation system using measurement correlation 10.

The updated state intervals, as resulting from the sub-step /5-3/ or possibly from the sub-step /5-4/, with their associated weight values, constitute the result of the box regularised particle filtering method for an execution of the sequence of steps /1/ to /5/. Several iterations are chained in a recurrent way, each new iteration from the results of the previous iteration. The iteration that is performed last provides a refreshed probability distribution that characterises the true state of the aircraft 20. Furthermore, the resulting updated state intervals, associated with their respective weight values, are to be used as previous state intervals for a new execution of the sequence of steps /1/ to /5/.

Figure 3:
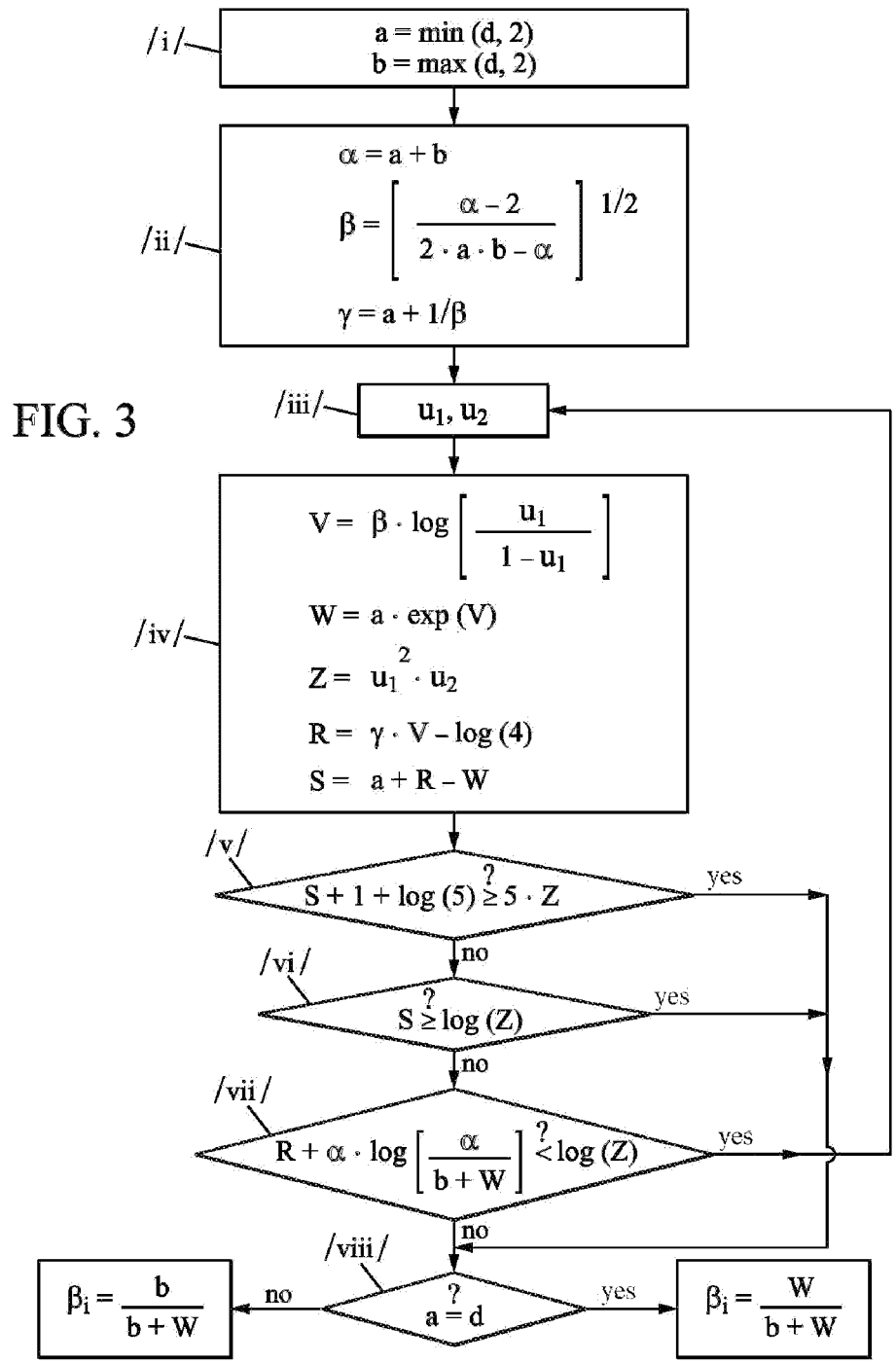
FIG. 3 is a flowchart of an algorithm that can be used to implement the invention.

A method for generating each random value $\beta_i$, so as to respect the statistical distribution law Beta(d, 2) will now be described with reference to [FIG. 3]. This method corresponds to Cheng's algorithm, published in the article entitled "Generating beta variates with non-integral shape parameters", Communications of the ACM, 21(4), pp. 317-322, 1978.

For this purpose, the following numbers a and b are first determined in step /i/:
a which is equal to the minimum value between d and 2: a=min(d, 2), and
b which is equal to the maximum value between d and 2: b=max(d, 2).
For most applications of the invention, d is greater than 2, so that a=2 and b=d.
In step /ii/, the three numbers $\alpha$, $\beta$ and $\gamma$ are then calculated such that:

$$\alpha = a+b, \text{ which is equal to } d+2,$$

$$\beta = [(\alpha-2)/(2 \cdot a \cdot b - \alpha)]^{1/2}, \text{ which is equal to } [d/(3 \cdot d - 2)]^{1/2}; \text{ and}$$

$$\gamma = a + 1/\beta.$$

The numbers $\alpha$, $\beta$ and $\gamma$ may have been pre-calculated and stored to be directly accessible by the calculation unit 3.
In step /iii/, two numbers $u_1$ and $u_2$ are each randomly generated according to the uniform law of statistical distribution, between 0 and 1, for example by using an LFSR type method. Then the numbers V, W, Z, R and S are calculated in step /iv/, according to the following formulas:

$$V = \beta \cdot \log[u_1/(1-u_1)], \text{ where log denotes the logarithmic function with base } e,$$

$$W = a \cdot \exp(V), \text{ where exp denotes the exponential function with base } e,$$

$$Z = u_1^2 \cdot u_2,$$

$$R = \gamma \cdot V - \log(4), \text{ and}$$

$$S = a + R - W.$$

The value of the number Z can advantageously be calculated each time by applying the method for calculating an estimate of $X^\alpha$ which was described above, at $X = u_1$ with $\alpha = 2$. Furthermore, the values of the logarithm and exponential functions can be obtained from tables of pre-recorded values for these functions.
Steps /v/ to /viii/ are then carried out successively, forming a sequence of tests which are applied in series:
step /v/: if $S + 1 + \log(5)$ is greater than or equal to 5.Z, go directly to step /viii/;
step /vi/: if S is greater than or equal to log(Z), go directly to step /viii/;
step /vii/: if $R + \alpha \cdot \log[\alpha/(b+W)]$ is less than log(Z), return to step /iii/;
step /viii/: if a is equal to d, then the value $\beta_i$ which is randomly generated according to the beta law with parameters d and 2, is equal to W/(b+W), and if a is different from d, it is equal to b/(b+W). For most applications of the invention, where d is greater than 2, the random value $\beta_i$ is equal to d/(d+W).
One of the advantages of this algorithm is that the number of executions of the sequence of steps /iii/ to /viii/ which is necessary to obtain the N random values $\beta_i$ is predictable.

It is understood that the invention may be reproduced by modifying secondary aspects of the implementations which have been described in detail above, while retaining at least some of the advantages mentioned. Among such possible modifications, the following are mentioned without limitation:
alternative algorithms may be used for some steps or sub-steps;
the inertial system may be used as a source for measuring the complete state of the vehicle. The state of the system as considered for the invention then comprises three acceleration values and three angular speed values, according to the three spatial coordinates, in addition to the three spatial coordinate values which identify a position for the vehicle, of the three speed values and the three attitude angular values. In this case, each state of the system comprises values for fifteen state coordinates;
in step /1/, a dynamic state change model may be used for the system, this model being able to take account, when it is a vehicle, of commands which are applied to one or multiple engine(s) and to a vehicle attitude control system; and
the calculation unit may be a processor with an ARM structure, a processor with several calculation cores, one or more graphics processor(s), etc., instead of an FPGA, DSP, CPU or RISC type chip.

Finally, the invention may be applied to fields other than aeronautics. For example, a box regularised particle filtering method which is in accordance with the invention may also be implemented for a ground vehicle, a maritime surface ship, a submarine, a satellite or a space probe, using each time a baseline and true state measures that are appropriate.

The invention claimed is:

1. A box regularised particle filtering method for predicting a state of a system, said system being a land, air, sea or space vehicle which is equipped with a navigation system using measurement correlation, the method comprising at least one execution of a sequence which includes the following steps:
/1/ a prediction step, comprising predicting subsequent state intervals, each subsequent state interval being obtained by applying at least one propagation rule to one of a plurality of previous state intervals;
/2/ a step of measuring a true state of the system;
/3/ a step of contracting at least one of the subsequent state intervals, according to at least one measurement result of the true state which was obtained in step /2/;
/4/ a step of updating weights, comprising assigning a weight to each subsequent state interval according to a size of said subsequent state interval as resulting from step /3/, with a size of said subsequent state interval as resulting from step /1/ before step /3/, and a weight of the previous state interval from which said subsequent state interval resulted in step /1/; and
/5/ a step of redistributing the subsequent state intervals, comprising replacing at least one of the subsequent state intervals i by $n_i$ sub-intervals originating from a division of the subsequent state interval i, i being an integer numbering index of the subsequent state intervals, and $n_i$ being a number of the sub-intervals which replace said subsequent state interval i, each sub-interval being intended to constitute a previous state interval for a subsequent iteration of the sequence of steps /1/ to /5/,
wherein at least one of the steps /1/ to /5/ comprises at least one calculation of an estimate of the value of $X^\alpha$, where X is a variable number for each execution of said step and $\alpha$ is a non-zero exponent value that is constant between different executions of said step, the number X being positive if the exponent $\alpha$ is not an integer and non-zero if the exponent a is negative, the calculation comprising the following steps:

/a/ writing the number X in the form $X=\pm(1+m)\cdot 2^{ex}$, where ex is a negative, positive or zero integer, and m is a mantissa comprised between 0 and 1, the value 0 being allowed, so that a binary representation of the number X is:

$I(X)=L\cdot(m+es+B)$, where $L=2^n$ with n which is a number of bits of a binary writing of the mantissa m, and B is a positive or zero constant number, called bias;

/b/ calculating a binary representation of $X^\alpha$ in the form:

$I(X^\alpha)=\alpha\cdot I(X)+L\cdot(1-\alpha)\cdot(B-\sigma)$, where $\sigma$ is a constant number whose value is recorded; and /c/ obtaining the estimate of the value of $X^\alpha$ from the binary representation $I(X^\alpha)$.

2. The method according to claim 1, wherein the step of the box regularised particle filtering method which comprises the calculation of the estimate of the value of $X^\alpha$ is step /5/.

3. The method according to claim 2, wherein the calculation of the estimate of the value of $X^\alpha$ further comprises executing at least once the following additional step:

/d/ calculating a new estimate of the value of $X^\alpha$ from a previous estimate of the value of $X^\alpha$, by applying a recursive algorithm for approximate equation solving to the equation $Y^{1/\alpha}-X=0$ of unknown Y, the estimate of the value of $X^\alpha$ which was obtained in step /c/ being used as a previous estimate for a first application of said algorithm, and the new estimate of the value of $X^\alpha$ which is produced by a $q^{th}$ application of the algorithm forming the previous estimate of the value of $X^\alpha$ for the $(q+1)^{th}$ application of said algorithm, if such a $(q+1)^{th}$ application of the algorithm is performed, q being an integer number greater than or equal to 1.

4. The method according to claim 2, wherein the number n of the bits of the binary writing of the mantissa m is equal to 23, and the bias B is equal to 127, or the number n is equal to 52 bits and the bias B is equal to 1023.

5. The method according to claim 2, wherein the constant number $\sigma$ is comprised between 0 and 1.

6. The method according to claim 1, wherein the calculation of the estimate of the value of $X^\alpha$ further comprises executing at least once the following additional step:

/d/ calculating a new estimate of the value of $X^\alpha$ from a previous estimate of the value of $X^\alpha$, by applying a recursive algorithm for approximate equation solving to the equation $Y^{1/\alpha}-X=0$ of unknown Y, the estimate of the value of $X^\alpha$ which was obtained in step /c/ being used as a previous estimate for a first application of said algorithm, and the new estimate of the value of $X^\alpha$ which is produced by a $q^{th}$ application of the algorithm forming the previous estimate of the value of $X^\alpha$ for the $(q+1)^{th}$ application of said algorithm, if such a $(q+1)^{th}$ application of the algorithm is performed, q being an integer number greater than or equal to 1.

7. The method according to claim 6, wherein the recursive algorithm for approximate equation solving that is used in step /d/ is Newton's method.

8. The method according to claim 7, wherein the number n of the bits of the binary writing of the mantissa m is equal to 23, and the bias B is equal to 127, or the number n is equal to 52 bits and the bias B is equal to 1023.

9. The method according to claim 7, wherein the constant number $\sigma$ is comprised between 0 and 1.

10. The method according to claim 6, wherein the number n of the bits of the binary writing of the mantissa m is equal to 23, and the bias B is equal to 127, or the number n is equal to 52 bits and the bias B is equal to 1023.

11. The method according to claim 6, wherein the constant number $\sigma$ is comprised between 0 and 1.

12. The method according to claim 1, wherein the number n of the bits of the binary writing of the mantissa m is equal to 23, and the bias B is equal to 127, or the number n is equal to 52 bits and the bias B is equal to 1023.

13. The method according to claim 1, wherein the constant number $\sigma$ is comprised between 0 and 1.

14. The method according to claim 1, wherein the exponent value a is equal to $+2$, $-2$, $+\frac{1}{2}$ or $-\frac{1}{2}$.

15. A calculation unit, comprising at least one first input adapted to receive results of repeated measurements of acceleration and angular speed of a system, and a second input adapted to receive results of repeated measurements of a true state of the system, additional to the acceleration and angular speed measurements, and the calculation unit being arranged to execute a box regularised particle filtering method which is in accordance with claim 1, so as to output a series of state intervals with respective weights, the weight that is associated with each of the state intervals corresponding to a probability value that the true state of the system is within said state interval.

16. The calculation unit according to claim 15, of field-programmable gate array circuit, fixed gate array circuit, or central unit processor type.

17. A navigation system using measurement correlation, adapted to be on board a vehicle, comprising:

an inertial system, adapted to iteratively measure accelerations and angular speeds of the vehicle, and to deduce, using the results of measurements of the accelerations and angular speeds, subsequent state intervals respectively from several previous state intervals, each state of the vehicle comprising position, speed and attitude coordinates of said vehicle;

a measurement system, adapted to iteratively measure at least one feature of a true state of the vehicle; and a calculation unit according to claim 8, and adapted to reduce at least one drift of the inertial system, among a position drift, a speed drift and an attitude drift, by using measurement results of the feature of the true state of the vehicle which are delivered by the measurement system.

18. A vehicle, comprising a navigation system using measurement correlation which is in accordance with claim 17.

19. The method according to claim 1, wherein the step of the box regularised particle filtering method which comprises the calculation of the estimate of the value of $X^\alpha$ is a sub-step of step /5/ which consists in calculating a measure value of a part of a subsequent state interval of the system, corresponding to a position interval of the system, a speed interval of said system or an attitude interval of said system, and/or another sub-step of step /5/ which consists in applying a probability kernel smoothing to the sub-intervals to obtain the previous state intervals of the subsequent iteration of the sequence of steps /1/ to /5/.

20. The method according to claim 1, wherein the constant number $\sigma$ is comprised between 0 and 0.5.

* * * * *